United States Patent [19]

Gurr et al.

[11] 4,393,446

[45] Jul. 12, 1983

[54] ROUTINE TIMER FOR COMPUTER SYSTEMS

[75] Inventors: George P. Gurr, Phoeniz, Ariz.; Robert M. Hardy, Scotia, N.Y.

[73] Assignee: General Electric Company, Schenectady, N.Y.

[21] Appl. No.: 258,122

[22] Filed: Apr. 27, 1981

Related U.S. Application Data

[63] Continuation-in-part of Ser. No. 67,996, Aug. 20, 1979, abandoned.

[51] Int. Cl.³ .............................................. G06F 11/30
[52] U.S. Cl. .................................................... 364/200
[58] Field of Search ... 364/200 MS File, 900 MS File; 371/18, 19, 62

[56] References Cited

U.S. PATENT DOCUMENTS

| 3,312,951 | 4/1967  | Hertz         | 364/200    |
|-----------|---------|---------------|------------|
| 3,763,474 | 10/1973 | Freeman et al.| 364/200    |
| 3,805,038 | 4/1974  | Buedel et al. | 371/18     |
| 3,825,901 | 7/1974  | Golnek et al. | 364/200    |
| 3,908,117 | 9/1975  | Naruse et al. | 371/62 X   |
| 3,909,795 | 9/1975  | Chang et al.  | 371/62 X   |
| 3,934,131 | 1/1976  | Perschy       | 364/200 X  |
| 4,183,083 | 1/1980  | Chatfield     | 364/200    |
| 4,212,059 | 7/1980  | Sato et al.   | 371/18 X   |

Primary Examiner—Thomas M. Heckler
Attorney, Agent, or Firm—Paul J. Checkovich; James C. Davis, Jr.; Marvin Snyder

[57] ABSTRACT

The processing of computer program delays and timers is placed outside the computer mainframe in a routine timer in order to reduce the amount of computer processing capability dedicated to keeping track of time intervals to be performed by the computer. Such a routine is particularly applicable to systems controlling a plurality of devices in which each device is controlled by a separate computer program designed to operate the device in a predetermined manner in response to specific conditions detected at the hardware site and transmitted to the computer.

26 Claims, 10 Drawing Figures

FLAG TABLE

| 15 | 14 | INDEX |
| --- | --- | --- |
| RETURN ADDRESS ||| 
| MOST SIG. TIME WORD |||
| LEAST SIG. TIME WORD |||

FLAG ADDRESS

*FIG. 2*

BIT 14-TIME OUT, AWAITING OUTPUT TO MEMORY (INTERNAL USE ONLY)

BIT 15 -0= NEW ENTRY (EXT.)
- 1 = CANCEL (EXT.)
- 0 = ACTIVE (INTERNAL)
- 1 = INACTIVE (INTERNAL)

*FIG. 3*

PRIORITY TABLE

HIGHER PRIORITY 15 14 13   12--8   7        0

NOT USED    ROUTINE NUMBER 1 0 0  ROUTINE WAITING TO BE ACTIVATED
0 1 0  TASK ACTIVE
0 0 1  IN DELAY IN ROUTINE TIMER

ROUTINE TIMER FOR COMPUTER SYSTEMS

This application is a continuation-in-part of application, Ser. No. 067,996, filed Aug. 20, 1979, now abandoned.

BACKGROUND OF THE INVENTION

The instant invention relates to computers, and more particularly to a routine for a computer in a real-time application.

Real-time applications of computers, i.e., computers monitoring or controlling real world activity of hardware devices, require control of input and output to the computer from each device to regulate the sequencing of computer operation. The computer typically performs numerous tasks for the hardware, one task at a time, but must complete all required tasks within a specified period of time to ensure the necessary servicing of each hardware device. The highest priority function required of the computer is to be performed first and the second priority item second, and so on.

Support of the several running programs requires a sort of "juggling act" where one program runs for a short time, and then control passes to another program that runs for a short while, then on to another program, and so forth. Generally, control is passed when a program delay occurs in the program being performed, or some piece of interface equipment is not available at the moment that it is needed. Conventional process control computer installations have real-time clocks associated with program interrupts, and special features of real-time multiprogramming operating systems to keep the program sequence in order. Computer applications that must keep up with real world activity must compromise between the desired size of least time interval (time quantization) and the size of the computer justifiable in cost terms for the particular installation. For a shorter least time interval checking a greater amount of computer capacity is required, thereby increasing computer overhead, computer capacity not dedicated to function processing. The recursion cycle of conventional systems is on the order of $\frac{1}{4}$ to $\frac{1}{2}$ second. Attempts to reduce this recursion cycle to much shorter times increase the computational load on the computer and eventually saturate it, by requiring the computer to recycle through all of the simultaneously-running programs during each recursion cycle. To control real time applications, prior art computers have devoted as much as a third of their processing capability to keeping track of time intervals. This dedication of computer processing capability to time keeping limits computer utilization, and wastes computer computation capability.

Accordingly, an object of the instant invention is to provide a routine timer outside the computer mainframe for controlling simultaneously-running delays and timers for a plurality of programs, so that the processing capability of the computer is increased without losing coordination of the processes being handled by the computer.

SUMMARY OF THE INVENTION

Briefly, in accordance with a preferred embodiment of the invention, a routine timer separate from the mainframe comprises an input/output controller, an analysis controller and a status indicator which is controlled by the input/output controller and the analysis controller. The routine timer provides a delay and event timing function for a mainframe computer. The routine timer includes means to signal the termination of a delay or the timing out of a timer.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGS. 8 and 9 are extensions of FIG. 7 where data are exchanged by the two controllers, the I/O controller and the analysis controller, based on the "hand shaking" flag arrangement provided by the status indicator.

Manner and Process of Making and Using the Invention

The specific features of the instant invention described herein and shown in FIGS. 1-10 are merely exemplary, and the scope of the invention is defined in the appended claims. Throughout the description and FIGS. 1-10, like reference characters refer to like elements of the invention.

Figure 1:
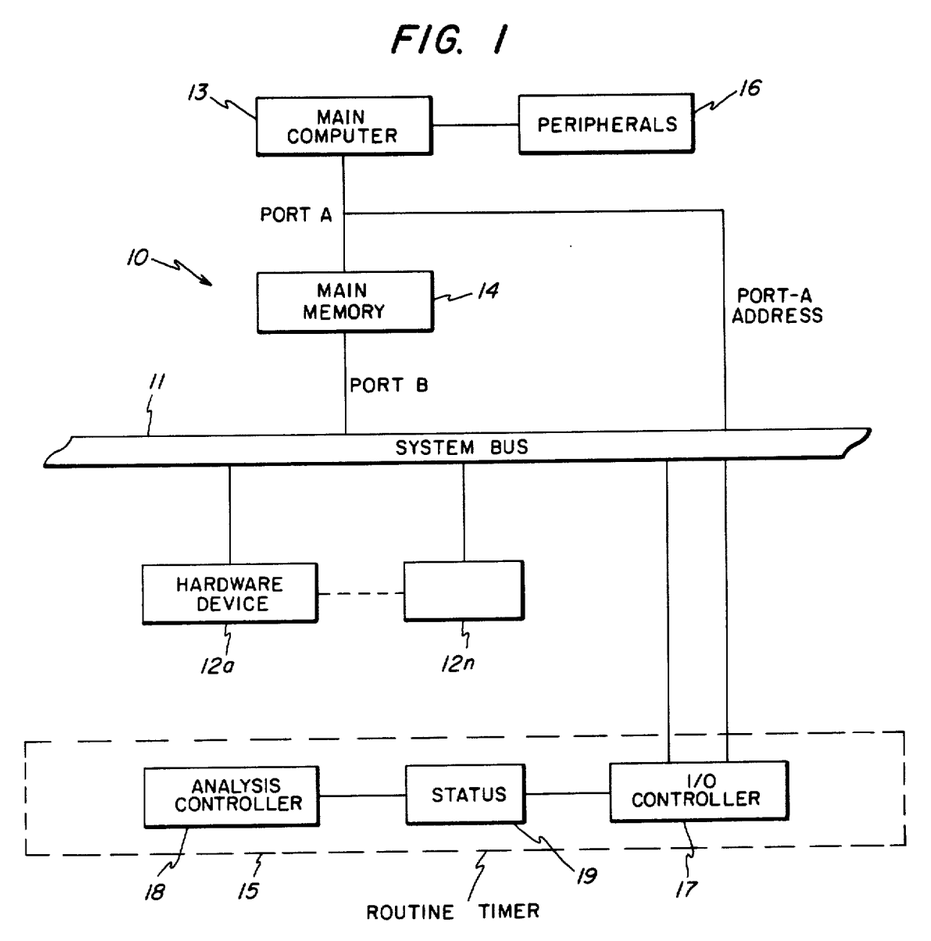
FIG. 1 is a system block diagram showing the routine timer connected to the main computer.

FIG. 1 shows a computer system 10 incorporating the instant invention. A system bus 11 interconnects hardware devices 12a . . . 12n which are to be controlled with a main computer 13, and a main memory 14 and a routine timer 15. The main computer has peripherals 16 of a type appropriate to the specific computer 13.

Routine timer 15 of the instant invention is connected to the main computer 13 through port A for monitoring and main memory 14 through port B for direct access. Routine timer 15 comprises an input/output (I/O) controller 17, an analysis controller 18 to process the information received by I/O controller 17, and a status indicator 19 interconnecting I/O controller 17 and analysis controller 18 to provide the appropriate sequencing of transfer of information between I/O controller 17 and analysis controller 18.

Hardware devices 12a . . . 12n are real-time application devices each requiring a separate functional control operated by a program routine executed by computer 13. The programs executed by computer 13 reach points in their sequencing when it is desired to delay or to employ an event timer. The delays are required to wait for something to happen such as to allow data to be provided from the hardware device necessary to a functional step of the program routine. The amount of time a delay is required to wait is called the length of the delay. The event timer is a check that a minimum elapsed time or length of the event timer has occurred, for example, a device operation might require a time delay for mechanical operation, or for other functional reasons. A routine timer 15 separate from the computer mainframe provides a timing function which keeps track of or processes all pending delays and event timers called for by software and hardware control and upon delay or timer termination an update of the status of a program in a priority table in the case of a delay or in the case of an event timer an adjustment of a flag in an appropriate place in the main memory occurs. While a program is delayed another program selected from the priority table can be executed. While an event is being timed the program requesting the timer can continue to be processed and alerted when the elapsed time has occurred. Delays can be used with or without external interruption. The interruption, if it occurs, could be triggered by an external event and terminate the delay and restart the program before the delay set in the routine timer had terminated. The program could take a different action when it is restarted by delay rather than an interrupt.

Figure 2:
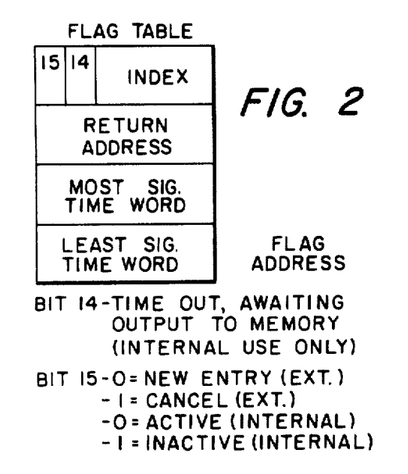
FIG. 2 is a block diagram of the flag table used in the instant invention.

FIG. 2 is a block diagram of a four word flag table which resides in the main memory of the computer and contains information used by routine timer 15 of the instant invention to process delays and timers. The first word of the flag table contains the identification code for the routine and identification of the routine's status, i.e., time out, awaiting output to memory, new entry, cancel, active or inactive. The second word contains the return address, i.e., the address in the main memory to be updated. The third word contains the "most significant time word," and the fourth word contains the "least significant time word," i.e., the time remaining in the delay or event timer, before notification of the termination of the delay or event timer is transferred to the main memory.

Figure 3:
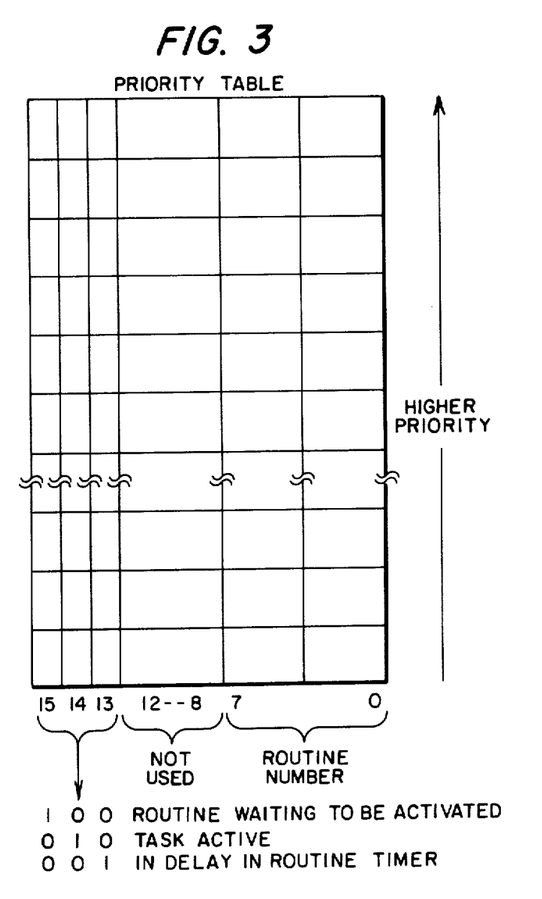
FIG. 3 is a block diagram of the priority table used in the instant invention.

FIG. 3 is a block diagram of a priority table which resides in the main memory of the computer, and is accessed by the main computer and the routine timer to control process sequence in connection with delays. Bits 0-7 identify the software routines on programs. Bits 13, 14 and 15 record the status of each routine. A routine may be waiting to be activated by the computer, as shown by bit 15; active in the computer, as shown by bit 14; or in delay in the routine timer, as shown by bit 13. The routine timer keeps the status of priority table entries updated to ensure that necessary functions are performed in their appropriate order of importance as the system is operating.

Figure 4:
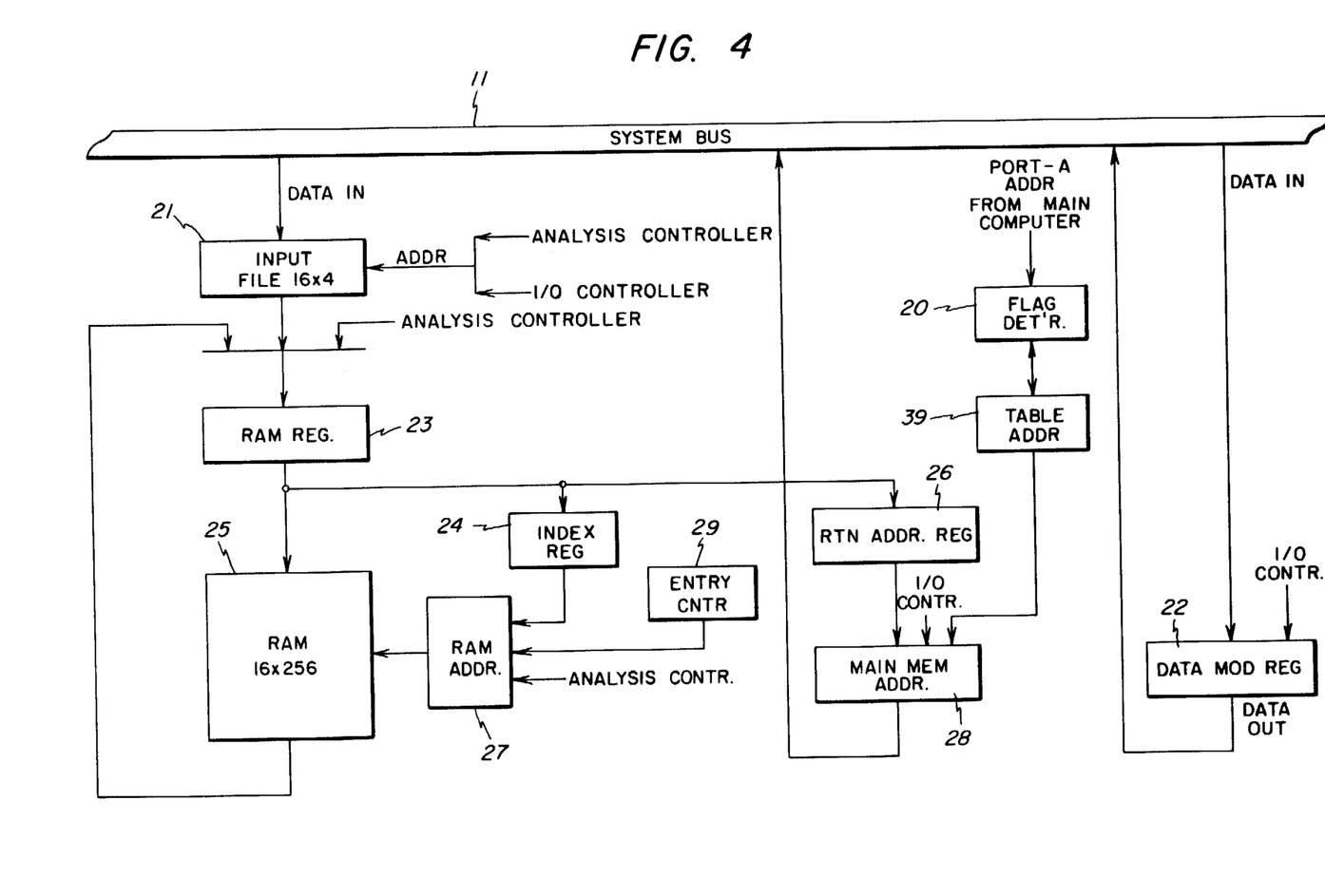
FIG. 4 is a detailed hardware block diagram of the routine timer of the instant invention.

As shown in FIG. 4, routine timer 15 monitors main computer 13 through port A, so that when a flag (an offer to provide input) appears at port A, flag detector 20 recognizes the flag and directs the routine timer to look for new data in the flag table. Flag detector 20 sets an internal flip-flop, the "new entry flip-flop" which is in the status block 19 shown in FIG. 1 I/O controller 17 is directed by its internal microprogram to periodically test status indicator 19 to determine whether data analysis controller 18 is set to receive an entry from main computer 13. If the appropriate conditions exist, I/O controller 17 selects the table address word from the table address 39, modifies the address through the main memory address 20 appropriately to sequentially point to flag table words 1, 2, 3 and 4 of FIG. 2 and starts the main memory transfer of the data via the system bus. I/O controller 17 then enters the four data words from the flag table in main memory into input file 21 and updates status indicator 19 and notifies the data modifier register 22 that the data has been transferred to input file 21. The main memory address word and the table address word are again used to address the flag table main memory 14, and the entry written into data modifier register 22 is entered into word 1 of the flag table indicative of the fact that the flag table has been read and it is ready to accept another entry. This completes the entry of a new routine delay or timer into the routine timer.

Data analysis controller 18 processes the active delays or timers residing in the routine timer. Delays and timers are processed in the same way by the routine timer 15. Periodically, analysis controller 18 checks status indicator 19, to detect when input file 21 contains new information. When new information is detected, analysis controller 18 will move the data, one word at a time, from input file 21 to temporary storage in RAM register 23. Then the first word, which identifies the routine delay or timer being processed, is moved from RAM register 23 to index register 24. Index register 24 holds the identification portion of word one, which locates word one in RAM 25 via RAM address register 27 where the first word of the four word set is to be stored. Word one, containing the status information (i.e., start new delay or cancel), is transferred from RAM register 23 to RAM 25. Words 2, 3 and 4 follow and index register 24 is modified at the RAM address block by the data analysis controller program as the words are entered into RAM 25. Having completed transfer of the new information, analysis controller 18 resets status indicator 19, clearing the way for I/O controller 17 to bring in another set of new data.

RAM 25 is mapped such that four sequential locations are alotted to the four words of each table entry. Each routine is identified by a unique member and has a dedicated RAM address for delays. There are also 32 sets of 4 words provided for timers. The portion of word one containing the routine identifier has no further use. Other bits in word one, however, contain status information necessary for analysis processing. In the course of analysis, the first word is examined to determine whether the delay or timer is active or inactive, or the delay or timer has timed-out on a previous cycle. If the first word status indicates that the routine is inactive, the remaining three words are skipped by analysis controller 18.

If examination of word one indicates that a delay or timer is active, word 4 (the least significant time word) is retrieved and decremented in RAM register 23 and returned to RAM 25. If the decrementing of word 4 causes overflow, i.e., the decrement exceeds the delay time established in word 4, word 3 (most significant time word) is also retrieved, decremented and returned, unless overflow occurs. If overflow of word 3 occurs, time-out of the particular delay has occurred. When time-out occurs, the data analysis controller program checks status indicator 19 to see whether the last output has been cleared by I/O controller 17. If the last output has been cleared, word 2 of the table which contains the address in the main memory of the word to be modified, which would be an address in the priority table in the case of a delay, is read from RAM 25 and transferred via RAM register 23 to return address register 26 via main memory address block 28 which points to the appropriate location in the main memory 14. Status indicator 19 is set by data analysis controller 18 to alert I/O controller 17 to perform the main memory transfer. If status indicator 19 has remained set from a previous time-out, data analysis controller 18 can go into a wait cycle until the previous output has cleared and the status indicator 19 set by I/O controller 17. Since the controller must examine all entries in RAM 25 and process those that are active within a specified period of time, the time required for processing those active timers and delays still to be processed is taken into account when allotting wait processing time. If inadequate time remains to accomplish output, then the status word (word one) is updated to "waiting for output" and is stored in RAM 25 to await the next time out check. If the output of word 2 to return address register 26 is accomplished, word one is updated to inactive status.

When I/O controller 17, operating on its internal microprogram, tests status indicator 19 and finds it set by data analysis controller 18, it jumps to its pre-programmed time-out microcode which causes the main memory address specified by the contents of return register 26 to be read. The data just read is routed to data modifier register 22, modified and stored back into main memory 14 in the same location in the memory. This changes an entry in the computer's main memory the priority table FIG. 3 if that is the return address from "delaying" status to "waiting to be activated" status. Thereby, in the case of a delay, the status of each routine indicated in the priority table is continuously updated to include the appropriate priority for each routine (e.g., associated with a given piece of hardware or software) being controlled based upon its status at the end of the immediately-preceding time increment. If a timer has timed out then a bit change occurs in the memory location associated with the timer and can be used to signify to the program that is running that the minimum elapsed time has transpired.

Figure 5:
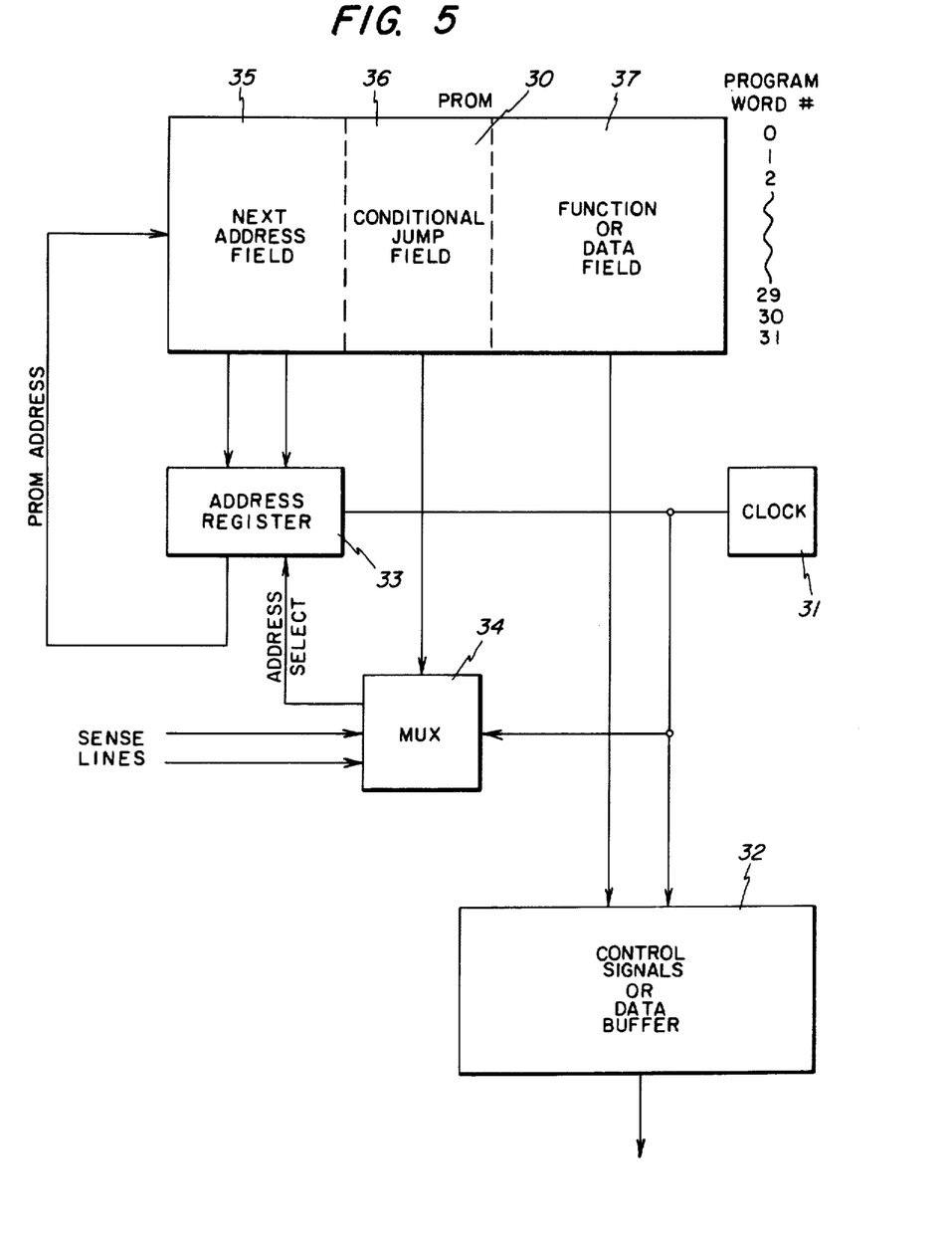
FIG. 5 is a hardware block diagram of one of the two controllers, the input/output control, and the analysis control.
Figure 6:
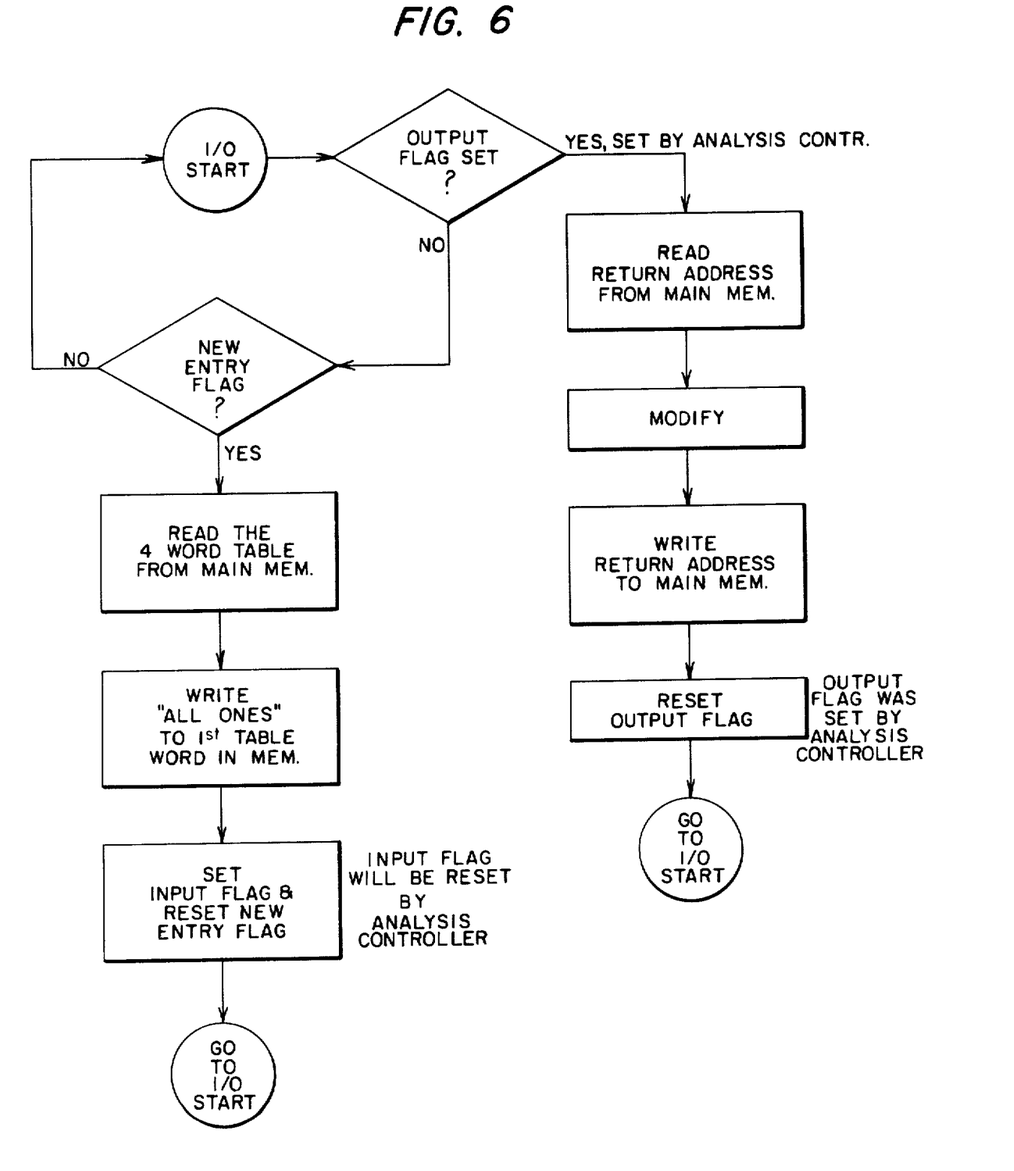
FIG. 6 is a flow chart of the steps performed by the input/output controller.

FIG. 5 is a block diagram of a control store used in each of the I/O controller 17 and data analysis controller 18. In each a PROM 30 provides information according to a sequence established by the clock 31, buffer 32, address register 33 and multiplexer 34. PROM 30 divides the instruction word into three fields: next address field 35, which contains the addresses of two instructions, one of which will be selected for execution at the next step in the sequence; conditional jump field 36, which provides a condition to be tested as the criteria for deciding which of the two instruction addresses to proceed to for the next step; and the function or data field 37, which provides such active data as "read", "write", "set", "reset", "count", etc., and provides data for addresses and codes.

The two controllers 17 and 18 together control all the activity of each part of the routine timer shown in FIG. 4, and communicate with each other via status indicator 19, whereby one controller will sense a flip-flop status condition set up by the other in status indicator 19, through the multiplexer 34, and vice versa. I/O controller 17 is controlled according to a microcoded program entered into its PROM which operates according to the flow chart shown in FIG. 6. The program in its PROM causes I/O controller 17 to check the flag in the output flip-flop of status indicator 19 to see whether it has been set by analysis controller 18. If the flag has been set, the return address is read from main memory 14, the data contained in the return address is modified and re-entered into main memory 14, the output flag is reset by I/O controller 17, and the function is completed. If the output flag was not set by analysis controller 18, I/O controller 17 checks to see whether the new entry flag has been set by flag detector 20 which results when the main computer 13 loads the flag table (FIG. 2). If not, I/O controller 17 begins its cycle again by checking the output flag set by data analysis controller 18. If the new entry flag has been set as described above, the four word table in main memory 14 will be read and entered into the routine timer. The routine timer will process the function as indicated by the information read from the main memory and reset the address word in the main memory to accept new data and a new routine to be run by main computer 13. The routine timer will then be ready for a new function, I/O controller 17 will set the input flag to indicate its present condition, and the new entry flag will be reset. I/O controller 17 will then repeat its cycle for the next function to be processed.

Figure 7:
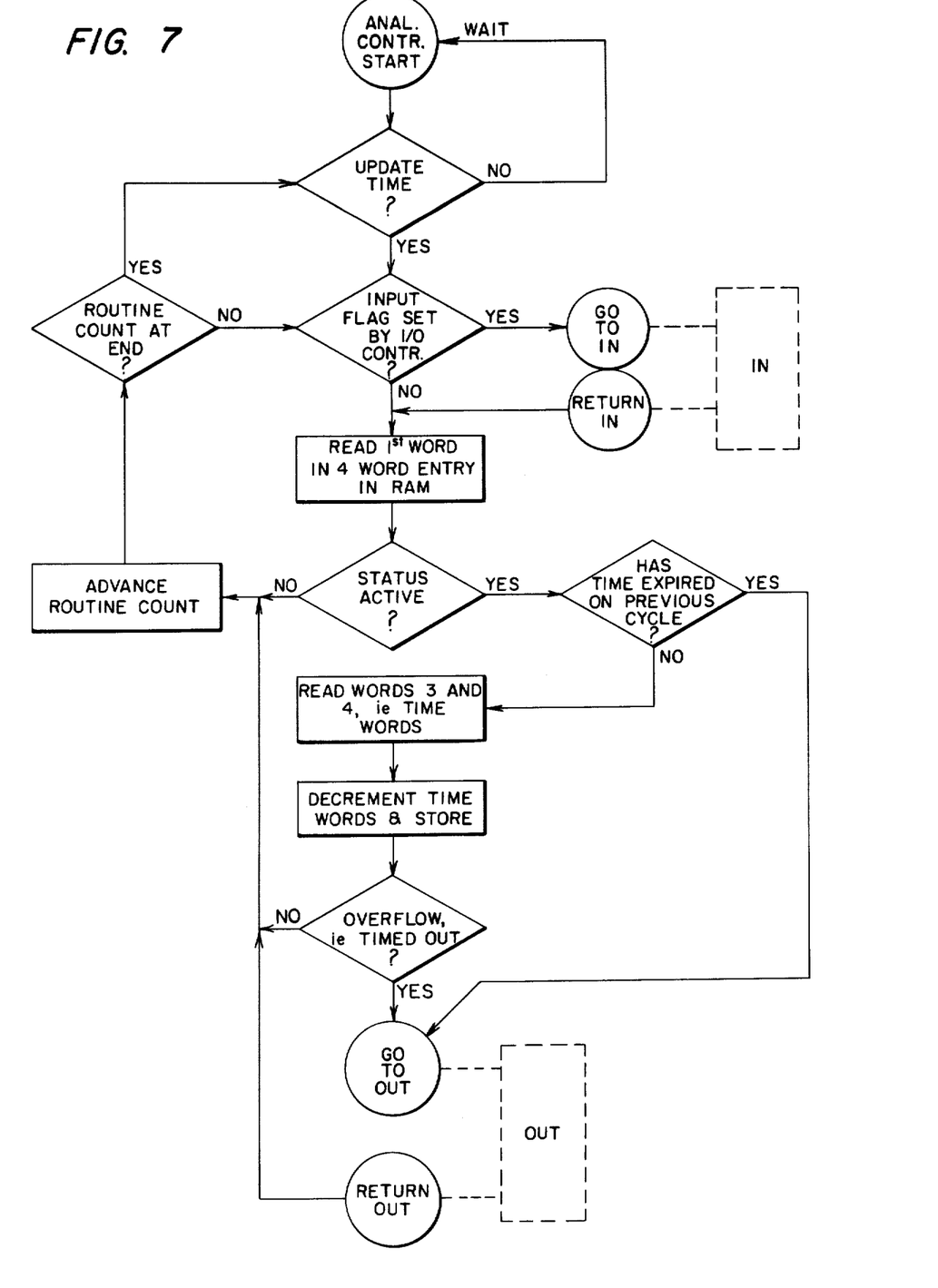
FIG. 7 is a flow chart of the steps performed by the data analysis controller.
Figure 8:
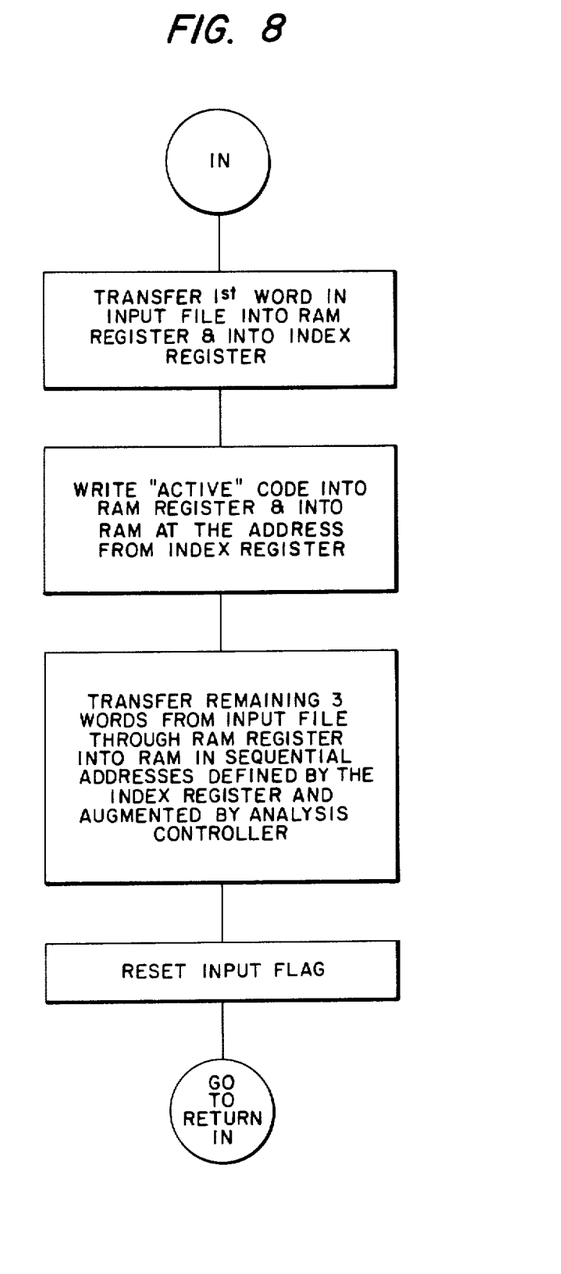
FIG. 8 is a flow chart of the steps performed by the analysis controller in receiving data for analysis that was obtained from main memory by the I/O controller.
Figure 9:
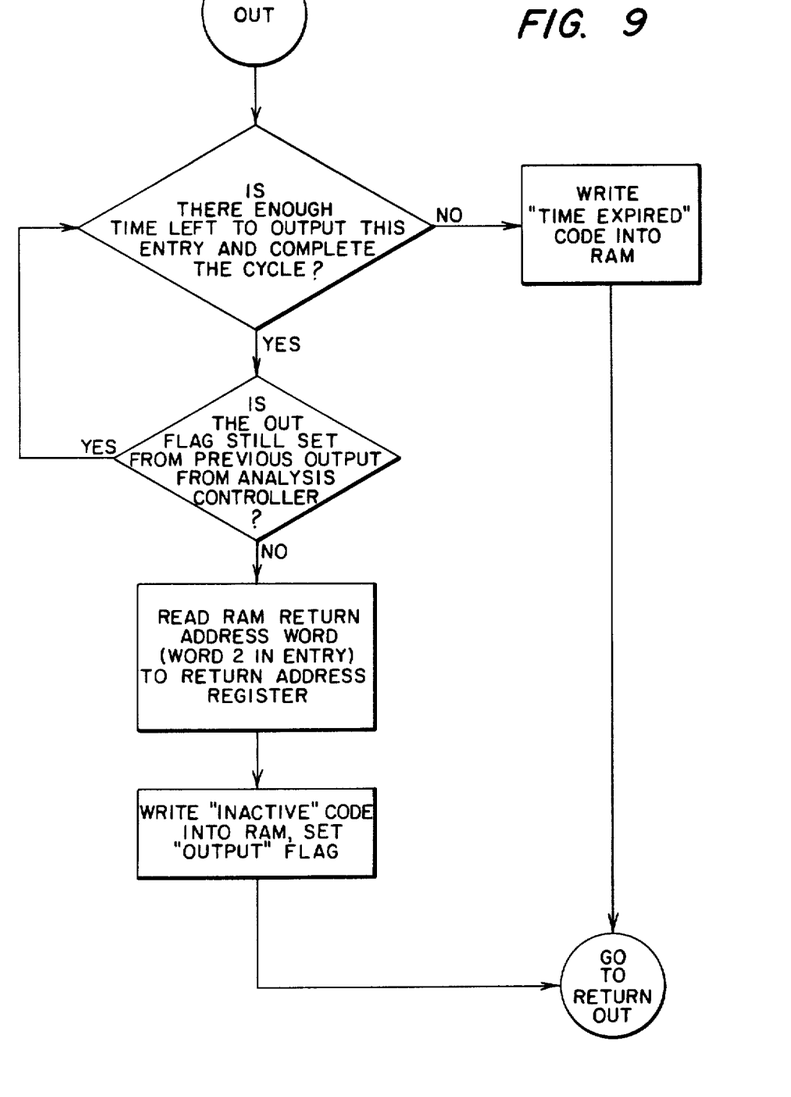
FIG. 9 is a flow chart of the steps performed by the analysis controller in supplying control data (timed out routines) to the I/O controller for transfer to the priority table in main memory or to programming tests tables in main memory.

FIGS. 7, 8 and 9 illustrate the flow chart for analysis controller 18. A clock 31 (FIG. 10) periodically notifies the analysis controller 18 that it is time to again update all entries residing in the RAM 25. The "update time" signal (FIGS. 10–64) occurs once every 200 microseconds, after which the analysis controller 18 begins its routine by first checking the status of the input flag set by I/O controller 17. If the flat has not been set, the first word in the four word entry in RAM 25 is read to determine whether the routine indicated is active. If it is not active, analysis controller 18 advances the entry count, and if the entry count table has been completed, i.e., all active routines checked, analysis controller 18 checks the time to see whether time update has occurred, and recycles. If the entry counter 29 is not at the end, analysis controller 18 will again check the input flag to see whether it has been set by I/O controller 17.

If the status indicated in the first word (of a four-word entry) in RAM 25 is active, analysis controller 18 checks to see if the time words should be decremented for the entry, or if the routine delay timed out on a previous cycle. If time still remains for the routine delay, analysis controller 18 reads the third and fourth words from RAM 25, decrements the time words, 3 or 4, and if overflow has occurred, i.e., the delay has timed-out, the routine delay is terminated and analysis controller 18 goes to "out" (FIG. 9) to supply the information to main computer 13. If the delay has not timed-out, analysis controller 18 cycles through the routine counter and advances the entry counter 29 to the next waiting delay. If time-out occurred on a previous cycle, analysis controller 18 goes immediately to "out" (FIG. 9) to determine whether to write the modified information into the main computer memory, or to hold until later. (After an entry times-out, it may have to be held for another cycle by the analysis controller 18 because of work load of I/O controller 17 at that instant.)

As shown in FIG. 8, if, when analysis controller 18 checks the input flag, it has been set by I/O controller 17, analysis controller 18 transfers the first word from input file 21 into RAM register 23 and the index register 24, writes "active" into the RAM register 23 and RAM 25, and transfers the remaining three words from input file 21 through RAM register 23 into RAM 25, in the four sequential dedicated addresses defined by index register 24 and as modified by analysis controller 18.

When this has been completed, the input flag is reset by analysis controller 18 so that I/O controller 17 will detect that analysis controller 18 is ready to receive new information.

As shown in FIG. 9, when a delay or timer has timed-out, or the cycle has expired, analysis controller 18 checks to see whether enough time is left to output the routine instruction and complete the cycle. If not enough time remains (as determined by status indicator 70, FIG. 10), analysis controller 18 writes "time expired" into RAM 25, returns the entry counter, advances the entry count and recycles analysis controller 18. If enough time remains, analysis controller 18 checks the output flag to see if it was reset by I/O controller 17, and if it has not been reset, i.e., it still has status set by analysis controller 18 at last output, then I/O controller 17 has not completed the operation required for the last timed-out entry, and analysis controller 18 recycles to check again whether adequate time remains to output the entry. If the flag is in the reset state, then analysis controller 18 reads the return address word (word 2 of the four-word entry) from RAM 25, writes the return address into RAM register 23 and return address register 26, writes "inactive" into RAM 25, and sets the output flag 52. Analysis controller 18 then recycles through the entry counter 29, updates the count and recycles. Analysis controller 18 must examine and decrement all active entries within the alotted cycle time, e.g., 200 microseconds. Therefore, transferring the results of the routine delay or timer to main memory 14 must wait if necessary to allow completion of updating the decrementing and status change for each active entry. This ensures that each delay is examined during each time increment.

Figure 10:
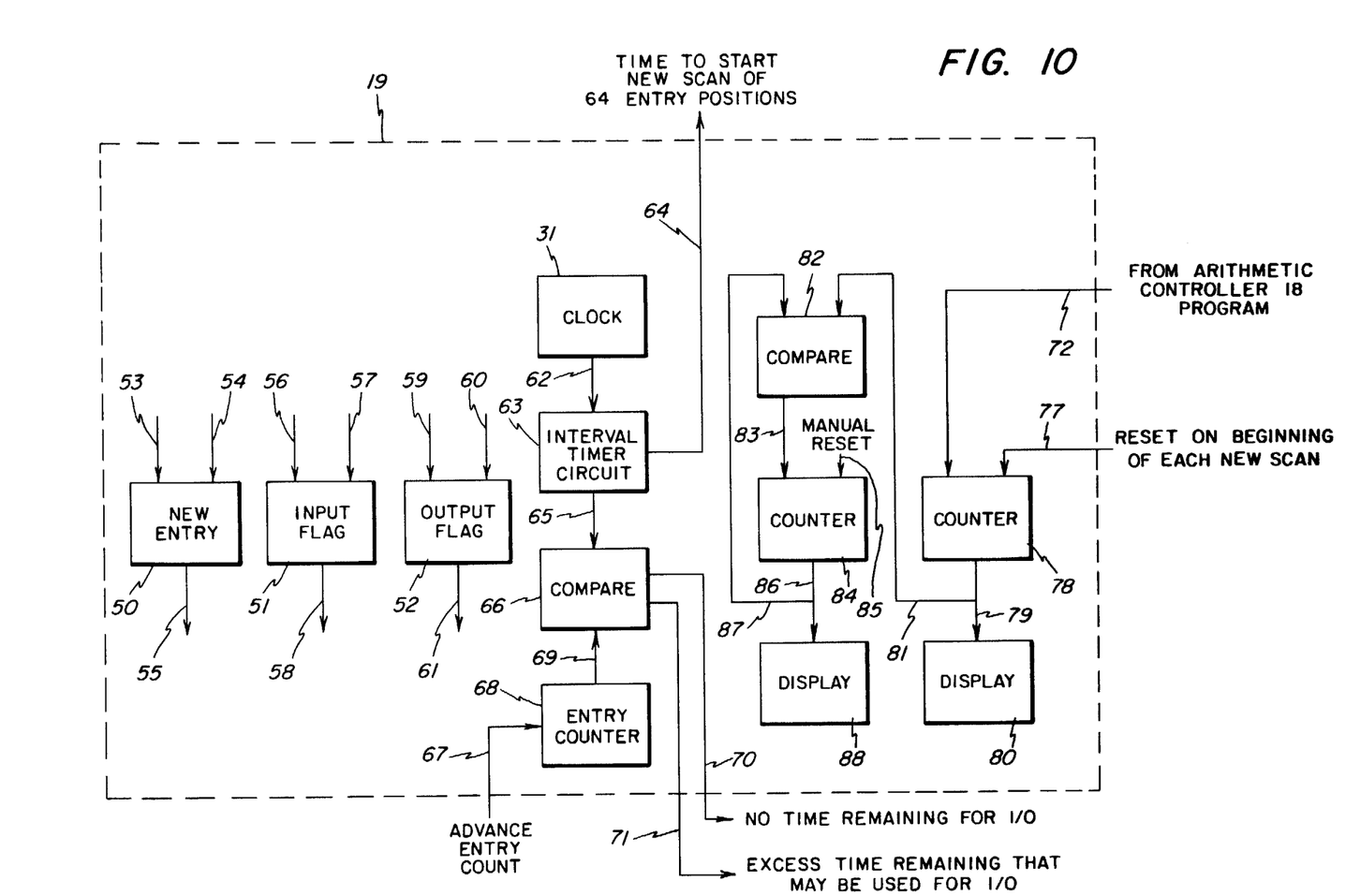
FIG. 10 is a detailed hardware block diagram of the status indicator of the instant invention.

As shown in FIG. 10, status indicator 19 includes these operating functions: a flip-flop status register 50,51,52 a spare time determination circuit 63,66 and a display man/machine interface 80,88. The flip-flop status register includes a new entry indicator 50, input flag 51, and output flag 52 as shown in FIG. 10, which conveys control information back and forth from one controller to the other. For example, I/O controller 17 must check status of analysis controller 18 before it can load a new entry for arithmatic processing. This is to determine if analysis controller 18 has accepted the last entry, and that the shared buffer (input file block 21, FIG. 4) is available. Likewise, analysis controller 18 must check the status of I/O controller 17 before certain data exchanges can be made. This is a common method of two asynchronous devices "shaking hands" with each other where data exchanges are involved.

New entry indicator 50 receives input 53 from the main computer via flag detector 20, FIG. 4, indicating that a new entry is awaiting entry to the routine timer. This sets a flag output 55 detected by I/O controller 17. After reading the flag table (FIG. 4) the I/O controller 17 provides reset input 54 to new entry indicator 50 which indicates that the previous new entry has been transferred to the routine timer.

Input flag indicator 51 receives input 56 from the I/O controller 17 and input 57 from analysis controller 18 indicating, respectively, that input file 21, FIG. 4, has loaded a routine and unloaded a routine. Output 58 is sensed by each of I/O controller 17 and analysis controller 18 to provide instruction on whether a new set of data can be entered or not.

Output flag 52 receives input 59 from analysis controller 18 indicating that return address register 26, FIG. 4, has loaded data from a timed-out routine delay or timed-out timer and input 60 from I/O controller 17 indicating that return address register 26 has transferred the output data to main memory 14 of the computer. Output 61 of output flag 52 is sensed by both I/O controller 17 and analysis controller 18 to maintain updated instructions concerning output of a processed delay or timer.

The spare time determination circuit portion of status indicator 19 is shown in block diagram form in FIG. 10. The purpose of the circuit is to compare the total time remaining for all processing to be completed to the amount of time required for all remaining entries. This is done to determine if there is excess time remaining that can be devoted to I/O.

As many as 64 entries can be residing in the RAM at one time 32 delays and 32 timers. Within a 200 microsecond period each of the 64 entries must be scanned and examined. Each entry that is active must be time-decremented, and if time-out occurs, provision must be made to output this fact to the main memory. Obviously, active entries take more time than inactive entries and timed-out entries take even more time than active entries. It is also conceivable that several time-outs can occur on the same scan. A new scan must begin every 200 microseconds to maintain the system's integrity. Therefore, decisions must be made on how long to wait on outputting without jeopardizing the system's timing integrity. If analysis controller 18 cannot afford the time to wait for I/O controller 17 to get rid of a previously timed-out entry, the current time-out entry will be tagged accordingly and put back in place in RAM 25 for outputting on the next scan, approximately 200 microseconds later.

Clock 31 provides an input 62 to interval timer circuit to continuously count down the 200 microsecond intervals and provide output 64 indicating that time to start a new scan of the 64 entries in the RAM 25 has occurred. Interval timer circuit 63 also provides output 65 to comparator 66 of the time left in the interval. Entry counter 68 receives input 67 from entry counter 29 to advance the count of routine delays and timers in the timer to the next entry awaiting output. Entry counter 68 provides a signal 69 to comparator 66 indicating the time necessary to complete the analysis of the remainder of the entries, plus the time required to transfer the expired entry over to the control of I/O controller 17. Comparator 66 provides either an output 70 indicating that inadequate time for input or output remains in the interval or an output 71 indicating that adequate time remains for input or output and analysis controller 18 acts accordingly.

Also within status indicator 19 is a display man/machine interface shown in block diagram form in FIG. 10. Its objective is to display the number of delays and timer entries currently active in the routine timer and to show the maximum number that have run at any one time since the device was last cleared manually. This is primarily a diagnostic tool for the programmers use in developing real-time programs. The circuit provides a measure of real-time system loading.

The number of currently active delays and timers is obtained as follows. In the routine analysis of entries in RAM 25, analysis controller 18 program checks for active delays and timers and the program branches accordingly. At the beginning of the program segment that is processed because of the detection of an active entry, analysis controller 18 issues signal 72 to advance counter 78. Counter 78, which is reset by signal 77 when the analysis controller 18 program begins its analysis at the first location in RAM 25, continues the counting of all active entries until the analysis controller 18 program proceeds through the last entry location in RAM 25. After the analysis of the last entry in RAM 25, the number in counter 78 is transferred by signal 79 and latched in display 80 (e.g., a Hex Display made by Dialco).

The number of time delays and timers entries active at any one time is obtained by supplying an output signal 81 from counter 78 to comparator 82, which compares the number of currently active delays and timers with a stored reference number which is the maximum number previously active at one time. An output signal 83 is provided to counter 84 which stores the maximum number and also provides an output signal 86 to a display 88 (e.g., a Hex Display made by Dialco) which allows an operator to know the maximum number of delays active, since the last observation. Counter 84 may be manually reset at 85 to get a new determination over a new time period. Output 86 is fed back to comparator 82 to provide an input signal 87 for comparison with the current number of active delays. The display readings provide data for programmer use in determining how to best use the routine timer and to develop appropriate priorities for the simultaneously running programs.

In an exemplary assembly a routine timer as described above was assembled employing the following parts manufactured by Texas Instruments:

| 8 | Type 7400 | Quad 2-Input Positive Nand Gates |
|---|---|---|
| 1 | Type 7402 | Quad 2-Input Positive Nor Gate |
| 13 | Type 7404 | Hex Inverters |
| 1 | Type 7408 | Quad 2-Input Positive Nand Gate |
| 1 | Type 7410 | Triple 3-Input Positive Nand Gates |
| 1 | Type 7420 | Dual 4-Input Positive Nand Gate | and using 19 Signetics Type 8T09 Quad Tri-State Bus Drivers. I/O controller 17 and analysis controller 18 employed Type 7442A 4-to-10 Line Decoder, Type 7474 Dual D-Type Flip-Flop, And Type 74151A Multiplexer of Texas Instruments, Type 82S123 8-by-32 Bit Read-Only Memory and Type 8T10 Quad Tri-State Bus Driver with Storage of Signetics Company. The status indicator 19 employed Type 7474 Dual D-Type Flip-Flop; Type 7485 4-Bit Magnitude Comparator, Type 7490 Decade Counter, Type 7493A 4-Bit Binary Counter, and Type 74164 8-Bit Parallel Out Serial Shift Register of Texas Instruments, and Hex Displays of Dialco. Flag detector 20 employed a Texas Instruments Type 7485 4-Bit Magnitude Comparator and Type 74283 4-Bit Full Adder. Input file 21 employed Texas Instruments Type 74170 4-by-4 Register Files. Data modifer register 22 used Signetics Type 8T10 Quad Tri-State Bus Drivers with Storage. RAM register 23 employed Texas Instruments Type 74193 4-Bit Up/Down Counters. Index Register 24 employed Texas Instrument Type 7493A 4-Bit Binary Counter and Type 74151A Multiplexer and Signetics Type 8T10 Quad Tri-State Bus Driver with Storage. RAM 25 was a Texas Instruments Type 74S200 256 Bit Read/Write Memory. Return address register 26 employed Signetics Type 8T10 Quad Tri-State Bus Driver with Storage. This list includes parts presently available and other compatible circuit components known in the art may be employed in other assemblies.

EXAMPLE OF ROUTINE TIMER APPLICATION

The MAIN computer on the PROBE Project (an electrical power distribution control automation system) spends approximately 70 percent of the total time in the so-called critical path of processing real-time data. That is, a real-time interrupt occurs once every 1041 microseconds indicating that there is new data available that must be processed before the next interrupt occurs to prevent loss of data. Following the interrupt, the computer spends the approximately next 700 microseconds processing this critical data. This leaves 300 microseconds, more or less, to devote to the algorithms associated with the other real-time functions of power distribution substation automation.

Wherever the program is operating at the time of a critical path interrupt, i.e., an interruption whose control takes precedence over currently running routines, current processing of other functions must cease, and the critical path operation must begin. After the critical path processing has been completed, the program may return to the function it left, or it may find that it needs to go process a function of a higher priority.

For purposes of explanation, assume that a fault (excessive current) has occurred on a feeder power line causing a circuit breaker to trip. The apparent sequence of activity (during the non-critical path 30% times) would be as follows:

The system would perform the breaker failure routine to determine that the breaker did in fact trip. If the breaker failed, then backup action would be taken to trip a breaker upstream in the system. Assume that the breaker tripped successfully. Then the breaker automatic reclosing function would be called to reclose the breaker with the assumption that most faults are of a nonpersistent nature and the fault would be cleared. This is done assuming a timer set for say 15 seconds at system initialization has elapsed showing a prior history for this breaker, that is has been closed for at least 15 seconds. If, upon reclosing, the fault turns out to be persistent, this process will continue with the breaker automatic reclosing occurring at intervals programmed as follows:

(Time values are typical)
- 1st Reclose after 0.5 seconds
- 2nd Reclose after 5 seconds
- 3rd Reclose after 30 seconds
- Then lockout breaker to prevent further reclosing until line maintenance is performed (the fault having now been determined to be persistent).

In the sequence described, the computer program must use its noncritical path time servicing the functions shown in the partial list of Table 1. The breaker failure routine must periodically check to see if breaker contacts change state appropriately as well as look for the feeder current to go to zero. These events are expected to occur within the range of about 50 critical path times ($\approx 50$ milliseconds). Therefore, the time lapse before the next check would be delegated to the routine timer for tracking and notifying the priority table when the next check is due.

TABLE 1

| TYPICAL PRIORITY TABLE ASSIGNMENTS | |
|---|---|
| PRIORITY | |
| 1 | Breaker Failure - Feeder 38 |
| 2 | Breaker Automatic Reclose - Feeder 38 |
| 3 | Events Scheduler |

TABLE 1-continued
TYPICAL PRIORITY TABLE ASSIGNMENTS

| PRIORITY | |
|---|---|
| 4 | Feeder Over Current - 38 |
| 5 | Breaker Failure - Feeder 37 |
| 6 | Breaker Automatic Reclose - Feeder 37 |
| 7 | |
| 8 | |
| 9 | |
| 10 | |
| 11 | Special Calculations |
| 12 | Load Tap Changer |
| 13 | Alarm Annunciator |
| 14 | Synchronism Check |
| 15 | |
| 16 | |
| 17 | |
| 18 | |
| 19 | Input Controller |
| 20 | Remote Control & Data Reporting |
| 21 | Calendar |
| 22 | Output |
| 23 | |
| 24 | Transformer Loss of Life Predictor |
| 25 | |
| 26 | |
| 27 | |
| 28 | |
| 29 | |
| 30 | Dead Man Timer |

At the time that the program is running the breaker failure routine the priority table (FIG. 3) would show "task active" status even though the routine might have been interrupted by the critical path. Upon return the process would resume where it left off. The breaker failure routine examines certain data to determine if the breaker has failed. If the data is not yet available, the program will delay this task and go on to other tasks until some time later when it will again look for breaker failure data. For explanation purposes, assume that this task is to be delayed for 10 milliseconds. This will be accomplished as follows:

The computer program changes the priority table (FIG. 3) entry for priority location No. 1 from "task active" to "in delay in routine timer". The computer program then examines the first word in the flag table (FIG. 2). If the word contains a minus one, then the flag table is empty and ready for a new entry. If not, the program waits. When the computer program finds the flag table empty it loads the four-word table with the following information.

FLAG TABLE

| WORD | | | |
|---|---|---|---|
| | 1 | NEW ENTRY | PRIORITY ROUTINE NUMBER ONE |
| | 2 | ADDRESS 1 IN PRIORITY TABLE | |
| | 3 | | TEN |
| | 4 | | MILLISECONDS |

The computer program then goes on to other tasks as specified by the priority table.

The routine timer operating under the direction of I/O controller 17 is constantly examining all memory accesses made by the computer program and comparing these addresses to a fixed number corresponding to the memory address of word four in the flag table (FIG. 2). Detection of the computer's accessing of this word is accomplished by FIG. 4 Block 20.

This causes the flag table address to be passed from the FIG. 4 table address Block 39 to the main memory address block 28 to the system bus. The routine timer under control of I/O controller 17 sequentially reads the four words of the flag table (FIG. 2) into the four-word input file FIG. 4, block 21). I/O controller 17 then sets a status in indicator 19 to notify data analysis controller 18 that a new entry is now in the input file 21.

I/O controller 17 then adjusts the main memory address block 28 to point to word one in the main memory flag table, and also enters a minus one into the data modification register 22. By way of the system bus 11, the minus one is then written into the flag table word one to indicate that the flag table has been emptied.

At the appropriate time after data analysis controller 18 has sensed the presence of a new entry, the first word from the input file 21 is transferred to RAM register 23 and to index register 24. Index register 24 will now contain the number "one" representing the identity of the priority routine (breaker failure routine) to be timed. Index register 24 points by way of the RAM address 27 to entry location number 1 in the RAM. The first word from the flag table which is now contained in the RAM register 23 is written into the RAM 25.

Data analysis controller 18 then adds one to the index register 24 number at the input to the RAM address block. At the same time the analysis controller 18 calls for the second word from the input file (block 21) to be loaded into the RAM register 23. This word is then written from RAM register 23 into RAM 25. The same procedure follows for words 3 and 4. Then analysis controller 18 resets the status flip-flop to indicate to I/O controller 17 that the new entry has been processed into RAM 25, freeing I/O controller 17 to accept the next new entry presented by the computer program.

Since each entry consists of four words, analysis controller 18 advances the entry counter 29 sequentially by fours. Once every 200 microseconds, the entry counter 29 will have advanced through all counts representing the available RAM spaces for the maximum 64 entries. When the entry counter points to RAM address number one, representing the example entry, the first word of the entry will be read into the RAM register 23. The bit 15 will show that the entry is in active delay and therefore the third and fourth words must be read and decremented. At the RAM address block 27 analysis controller 18 adds the number 3 to the contents of the entry counter 29. This sets the RAM address for reading of the least significant time word (word 4) into the RAM register 23 for decrementing.

After decrementing in RAM register 23, the time word is examined for overflow. If overflow occurred, this means that the least significant word passed through zero and borrowing has to take place from the most significant of the two time words. In that case, after storing the decremented word in RAM 25, the most significant time word (word 3) would be accessed, decremented and restored in RAM 25 by a like method.

The entry counter 29 would then be advanced to point to the next entry. This process would continue until such time as the time words have both been decremented to the point where the most significant time word (word 3) passes through zero. The overflow bit from the RAM register 23 then indicates that the routine has timed out. In this example, the 10 milliseconds would count down to zero after 50 of the decrements that occur at 200 microsecond intervals.

Analysis controller 18 then checks the status of I/O controller 17 to determine that I/O controller registers are available for transferring the timed-out information back to the computer's priority table. Analysis controller 18 now reads the second word from the entry which contains address number 1 in the computer's priority table, FIG. 3. The entry counter still points to the entry, and the RAM address is adjusted by analysis controller 18 at the RAM address block 27 to point to the correct word within the entry. The priority table address 1 is read from the RAM 25 into the RAM register 23 and then transferred into the return address register 26. Analysis controller 18 is now through processing this entry and writes "inactive" into the first word of the entry in RAM 25, sets a status flip-flop for I/O controller 17, and goes on about the sequential accessing of other entries.

I/O controller 17 senses the status flip-flop of indicator 19 set by analysis controller 18 indicating that return address register 26 is loaded and that the computer's priority table requires updating. The address from return address register 26 is transferred into the main memory address block 28 and a main memory read operation is initiated. Since the main memory address is that of priority table address number 1, the contents of that location are read into the data modifier register 22 by way of the system bus 11.

I/O controller 17 then modifies the word in data modifier register 22 to indicate "routine waiting to be activated" (see FIG. 3). Then I/O controller 17 initiates a main memory write cycle, using the address from the main memory address block 28 and the modified data from data modifier register 22. This operation then updates the priority table to indicate to the computer program that the highest priority routine requests action. In this example it means that it is again time to test conditions for power circuit breaker failure. The I/O controller 17 having completed its task resets the status flip-flop in indicator 19 to show availability to analysis controller 18 for the next task.

In the meantime, the priority table is examined for the next highest priority function that needs to be serviced. Routines requiring servicing during fault processing include the events scheduler, special calculations, alarm annunciator, remote control and data reporting, and others listed in the priority table of Table 1. Suppose, for example, that the dead man timer, or stall indicator, as it is sometimes called is being serviced. The dead man timer (DMT) has the lowest priority and is a function that provides an output pulse to verify correct computer operation and to maintain the on-line condition (i.e., if the DMT is not serviced within a prescribed period of time, it will not supply a pulse to a hardware stall timer to restart the hardware stall timer and a relay will trip out and the computer system will shut down. The DMT function program contains a delay so that it will not need servicing more often than is needed to restart the stall timer which is set for say 15 seconds thereby saving processing time. Such programs as breaker failure routine and breaker automatic reclose are of higher priority and will be treated first if they are found to be waiting for action in the priority table as set there by the routine timer. Since the DMT function has the lowest priority it ensures that when it has been reached the whole table has been serviced.

In the case of the breaker automatic reclose, it is apparent that if the process has progressed through the first reclose, followed by a second trip command and a second breaker failure routine (with successful tripping), then the breaker reclose function will be called upon to wait 5 seconds and then command the breaker to reclose. The 5 second time value associated with this routine would be loaded into the routine timer and this function would be suspended until the routine timer updates the priority table indicating that the 5 seconds has expired and at which time this function will again assume its number 2 priority rating. During this five seconds the computer can process many other functions, such as completing the lower priority task of the dead man timer, which when completed, it's 10 second value will go into the routine timer and remain until it's time to again enter the priority table in task number 14 as shown in Table 1.

The routine timer of the instant invention has the capacity for maintaining individually-running concurrent time delays and timers for 64 separate items with a recursion cycle of 200 microseconds. The instant invention provides coordination of process time for the plurality of programs running simultaneously, and performs the program "juggling act." By using the instant invention, the program timing function can be taken outside the main frame of the computer, therefore dramatically reducing computational overhead, i.e., computer processing capability utilized to maintain status and sequencing information with respect to multiple simultaneously-running programs. Thereby, the real-time clock may be moved outside the computer itself and the computational capacity of the computer used to its maximum extent.

While the invention has been particularly shown and described with reference to a preferred embodiment thereof, it will be understood by those skilled in the art that various changes in form and details may be made therein without departing from the spirit and scope of the invention.

What is claimed is:

1. A method of processing routine delays for a main computer, including a main memory, monitoring a plurality of hardware devices operating simultaneously and controlling real-time tasks of said hardware devices according to a plurality of preprogrammed process routines stored in a main memory including a respective routine for each real-time task, comprising the steps of:
    identifying each of a plurality of process routines for servicing one of a plurality of real-time tasks, respectively, to be controlled by the main computer with a unique identifier which said main computer is programmed to recognize;
    supplying task data from said plurality of devices to be received by said main computer for use in a plurality of identified process routines;
    processing said process routines in said main computer in order of a predetermined priority stored in a table in the main memory until a predetermined memory address is accessed by the routine currently being processed, thereby activating a routine delay and stopping processing of said routine undergoing processing by the main computer;
    transferring processing of said routine having been stopped to a routine timer located outside said main computer, said routine timer having a data analysis control means for processing said delay simultaneous with other routine delays; and
    after said delay is terminated, returning processing of the routine having been stopped to said main computer.

2. The method of claim 1 further comprising maintaining an updated routine priority table in said main memory wherein each routine status is entered according to activity within said main computer and updating said routine status when a delay is terminated.

3. The method of claim 2 wherein said step of processing routine delays comprises establishing a memory location for storing a time duration for each delay in said data analysis control means of said routine timer, decrementing said time duration for each said delay, respectively, by successive predetermined time segments at regular predetermined time intervals equal in length to said time segments; and returning processing of each of said delayed routines to said main computer, respectively, after said time duration for each said delayed routine, respectively, has been decremented to zero.

4. The method of claim 3 wherein said predetermined time segment equals 200 microseconds.

5. The method of claim 3 wherein said step of returning said routine processing of each of said delayed routines, respectively, to said main computer after said respective delay has terminated comprises the step of delaying said returning of said routine processing in response to an instruction from said routine timer to complete decrementing all delayed routines by said predetermined time segment.

6. The method of claim 5 wherein all routine delays are decremented within 200 microseconds.

7. The method of claim 1 wherein said transferring of processing to and from the routine timer is controlled by an input/output control means within said routine timer.

8. The method of claim 1 wherein said step of processing routine delays comprises decrementing each delay during each said predetermined time interval and postponing, if necessary, return of processing to routines having terminated delays to said main computer so that said decrementing for all routine delays can be completed within a time equal to said interval.

9. The method of claim 8 wherein said step of postponing return of routine processing to routines having terminated delays to said main computer comprises checking a flag indicative of time remaining in said predetermined time interval, comparing said remaining time with a signal indicative of the time required to complete decrementing of all routine delays, and not returning processing of terminated delays if not enough time remains to decrement all routine delays in said predetermined time interval.

10. A method of processing timers of a main computer including a main memory monitoring a plurality of hardware devices operating simultaneously and controlling real-time tasks of said hardware devices according to a plurality of preprogrammed process routines stored in a main memory including a respective routine for each real-time task, comprising the steps of:
identifying each of a plurality of process routines for servicing one of a plurality of real-time tasks, respectively, to be controlled by the main computer with a unique identifier which said main computer is programmed to recognize;
supplying task data from said plurality of devices to be received by said main computer for use in a plurality of identified process routines;
processing said process routines in said main computer in order of a predetermined priority stored in a table in the main memory until an event timer is initiated by accessing a predetermined memory addressed by the routine currently being processed;
transferring processing of said timer to a routine timer located outside said main computer, said routine timer having a data analysis control means for processing said timer simultaneously with other active timers; and
after said timer is terminated, setting a flag in said main computer.

11. The method of claim 10 wherein said step of processing timers comprises establishing a memory location for storing a time duration for each timer, in said data analysis control means of said routine timer, decrementing said time duration for each said timer, respectively, by successive predetermined time segments at a regular predetermined time intervals equal in length to said time segments; and setting a flag in said main computer after said time duration for each said timer has been decremented to zero.

12. The method of claim 11 wherein said predetermined time segment equals 200 microseconds.

13. The method of claim 11 wherein said step of setting a flag in said main computer after said timer has terminated comprises the step of delaying said setting of the flag in response to an instruction from said routine timer to complete decrementing all timers by said predetermined time segment.

14. A computer system for providing real-time servicing to a plurality of hardware devices comprising:
a main computer for processing a plurality of preprogrammed routines for servicing respective ones of said hardware devices;
a main memory coupled to said main computer to exchange data back and forth;
a routine timer located outside said main computer for simultaneously processing event timers called for by said preprogrammed routines run in said main computer simultaneously, said routine timer comprising means for monitoring said main computer during processing of said plurality of routines to detect predetermined memory access associated with said routines being processed;
input/output control means for sequencing the transfer of data containing the length of an event timer called for by a specific routine from said main memory to said input/output control means and for providing signals indicative of event timer termination of a specific event timer to said main memory;
data analysis control means for processing information provided by said input/output control means by decrementing each event timer by a predetermined time segment and informing said input/output control when an event timer has terminated; and
means to control transfer of information between said input/output control means and said data analysis control means.

15. A computer system for providing realtime servicing to a plurality of hardware devices comprising:
a main computer for processing a plurality of preprogrammed routines for servicing respective ones of said hardware devices;
a main memory coupled to said main computer to exchange data back and forth;
a routine timer located outside said main computer for simultaneously processing delays called for by said preprogrammed routines run in said main computer, said routine timer comprising means for monitoring said main computer during processing of said plurality of routines to detect predetermined memory access associated with said routines being processed;

input/output control means for sequencing the transfer of data containing length of a delay of a specific routine from said main memory to said input/output control means and for providing signals indicative of delay termination of a specific delay to said main memory;

data analysis control means for processing information provided by said input/output control means by decrementing each delay by a predetermined time segment and informing said input/output control when a delay has terminated; and means to control transfer of information between said input/output control means and said data analysis control means.

16. The apparatus of claim 15 wherein said routine timer further comprises a real-time clock to control the decrementing of each respective routine delay in a series of successive equal time segments.

17. The apparatus of claim 15 further comprising means for uniquely locating each routine delay within the routine timer at a given time.

18. The apparatus of claim 17 further comprising means for cancelling a routine delay being processed by said routine timer responsive to changes in conditions of said external hardware devices.

19. The apparatus of claim 18 further comprising means for updating the length of a routine delay being processed by said routine timer responsive to changes in conditions of said external hardware devices.

20. The apparatus of claim 19 wherein said means for controlling transfer of information between said input/output control means and said data analysis control means comprises resettable indicator means for providing at least one flag whose state is established by said input/output control means to be read by said data analysis control means and vice versa.

21. The apparatus of claim 20 wherein said input/output control means includes means to retain data to be transferred to said main computer while said data analysis controller completes decrementing of each of said routine delays.

22. The computer system of claim 15 wherein said main memory includes a predetermined priority table of the preprogrammed routines and their delay status.

23. The computer system of claim 22 wherein said transfer of data to the input/output control means concerning a particular routine delay further includes the address in the priority table corresponding to the preprogrammed routine delayed.

24. The computer system of claim 23 wherein said signals indicative of a delay termination of a specific delay alters the status of the associated preprogrammed routine in the priority table.

25. A computer system for providing realtime servicing to a plurality of hardware devices comprising:

a main computer for processing a plurality of preprogrammed routines for servicing respective ones of said hardware devices;

a main memory coupled to said main computer to exchange data back and forth;

a routine timer located outside said main computer for simultaneously processing delays and event timers called for by said preprogrammed routines run in said main computer, said routine timer comprising means for monitoring said main computer during processing of said plurality of routines to detect predetermined memory access associated with said routines being processed;

input/output control means for sequencing the transfer of data containing the length of a delay and length of an event timer of a specific routine from said main memory to said input/output control means and for providing signals indicative of delay and event timer termination to said main memory;

data analysis control means for processing information provided by said input/output control means by decrementing each delay and each event timer by a predetermined time segment and informing said input/output control when a delay has terminated and when an event timer has terminated; and means to control transfer of information between said input/output control means and said data analysis control means.

26. The apparatus of claim 25 wherein said routine timer further comprises a real-time clock to control the decrementing of each respective routine delay and timer in a series of successive equal time segments.

* * * * *